D. B. WESSON.
Revolving Fire-Arm.
No. 222,168. Patented Dec. 2, 1879.
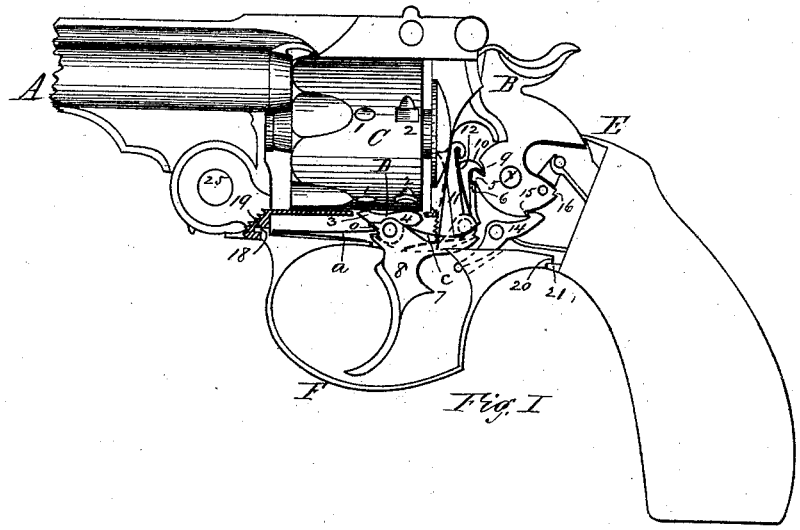
Fig. I
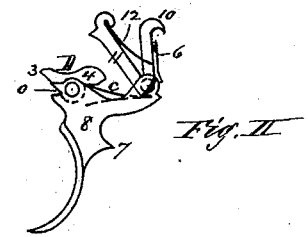
Fig. II

UNITED STATES PATENT OFFICE.

DANIEL B. WESSON, OF SPRINGFIELD, MASSACHUSETTS.

IMPROVEMENT IN REVOLVING FIRE-ARMS.

Specification forming part of Letters Patent No. 222,168, dated December 2, 1879; application filed August 8, 1879.

*To all whom it may concern:*

Be it known that I, DANIEL B. WESSON, of Springfield, in the State of Massachusetts, have invented a new and useful Improvement in Revolving Fire-Arms; and I do hereby declare that the following is a full, clear, and exact description thereof, reference being had to the accompanying drawings, making a part of this specification, and to the letters of reference marked thereon.

The object of my invention is to provide a self-cocking revolving fire-arm with a double cylinder-stop; and it consists of a piece pivoted to the trigger, having thereon two projections or parts thereof, one on each side of its pivot, adapted to engage in two corresponding series of recesses or indents, made in the cylinder, said double stop having a movement independent of the trigger, to engage with one or the other series of indents.

Figure I is a side view of a revolving fire-arm having my invention applied, with a part of the frame broken away beneath the cylinder, showing the pivoted stop, and with the lock-plate removed to show the lock mechanism; and Fig. II is a side view of the trigger, cylinder-stop, and the dog which is connected with the trigger and operates the hammer when cocking it with the trigger.

In the drawings, A represents the barrel, C the cylinder, E the frame, and B the hammer, of a revolving fire-arm; and in the outer surface of the cylinder are made two series of cavities or indents, 1 and 2, those in each series corresponding in number with the chambers in the cylinder.

The lower part of the trigger 8 is made of the usual or any convenient form, and in its upper part is pivoted the double stop D, the trigger-spring $a$ operating to keep its forward end, 3, forced upward, and the stop-spring $c$, located in the rear part of the trigger, operating to keep the rear end, 4, of the stop forced upward. A projection, 7, is made on the rear side of the trigger, and above the trigger extends rearward, and is provided with a shoulder, 15; and a dog, 10, is pivoted to the rear part of the trigger, which dog is provided with a shoulder, 6, arranged to engage with a shoulder, 5, on the tumbler of the hammer, when the dog is moved upward. The upper end of this dog 10 terminates in a hook arranged to engage in a notch, 9, in the tumbler of the hammer. The pawl 11, which is used to rotate the cylinder, is also pivoted to the rear part of the trigger, a spring, 12, secured to the pawl, operating to press back the dog 10 to keep it always in contact with the tumbler, and also to keep the pawl in contact with the ratchet on the rear end of the cylinder; and the tumbler may also be provided with the ordinary half-cock and cock notches 15 and 16, the sear 14, which engages therewith, extending forward at its front end, so as to be pressed against by the projection 7 on the trigger, when the latter is moved back.

The hammer may be cocked by pulling it back with the thumb until the rear end of the sear 14 enters the cock-notch 16, and if the trigger then be pulled back, the upper side of the projection 7 on the trigger strikes against the lower side of the forward end of the sear, and tripping it releases the hammer to strike the cartridge or firing-pin.

The hammer may be cocked, the cylinder rotated, and the arm discharged in the following manner: When the hammer is down and in its extreme forward position, the forward end, 3, of the stop D, being forced upward by the trigger-spring $a$, is in one of the detents, 1, in the exterior of the cylinder, and holds the latter securely in that position; but if the trigger is pulled back, the shoulder 6 of the dog 10 engages with the shoulder 5 on the hammer and rotates the latter on its pivot $x$ until the sear 14 engages in the half-cock notch 15 of the tumbler. At this point, if the trigger be held back by the finger, the forward end, 3, of the stop D is held out of the indent 1, and the cylinder may then be freely rotated with the hand, as at this point the rear end, 4, of the stop is also just out of the rear indent, 2, in the cylinder. If the backward movement of the trigger is continued, the rotation of the hammer is continued nearly to the point when the sear would engage with the cock-notch of the tumbler at 16; but at this point the projection 7 on the rear side of the trigger is in position just beneath the forward end of the sear to prevent this engagement, and at the same time the hammer has rotated so far on its pivot that the shoulder 6 on the dog 10 slips off the shoulder 5 of the tumbler, and the hammer is released, and is then free to be thrown forward by the mainspring.

In the above-described operation, as soon as the backward movement of the trigger commences, the forward end, 3, of the stop is drawn down and out of the indent 1 in the cylinder, and almost immediately the rear end, 4, of the stop, being pressed up by the spring $c$ as the trigger is pulled back, is in a position to enter the next indent in the series 2, which occurs when the cylinder has been rotated by the pawl 11, so as to bring the next chamber in front of the hammer and into line with the barrel, and the cylinder is thereby held firmly in position while the arm is discharged.

It will thus be seen that the cylinder is held securely in position by the double stop D at all times, except at a point where the hammer is at half-cock, at which point, if the trigger is held back, the cylinder may be rotated by the hand, to bring any desired chamber of the cylinder into line with the barrel, and the arm may be discharged rapidly by the single operation of pulling the trigger. The arm may also be discharged like any ordinary revolver, by cocking the hammer with the thumb in the usual manner, in which case, as the dog 10 and the pawl 11 are both pivoted to the rear end of the trigger, as the hammer is pulled back, the notch 9 in the tumbler, engaging with the hook at the upper end of the dog, pulls the rear part of the trigger upward, withdrawing the stop 3 from the indent 1 and revolving the cylinder. In this way the cylinder may be revolved, bringing each chamber, in succession, into line with the barrel, by simply moving back the hammer and letting it forward again with the thumb without pulling the trigger.

I am aware that fire-arms have heretofore been made in which two projections were made upon and solid or in one piece with the trigger, and adapted to engage with corresponding recesses made in the cylinder; and I am also aware that a single stop, made separate from the trigger, and hung upon the trigger-pivot, and adapted to engage with a single series of recesses made in the cylinder, has heretofore been made and used; and I do not claim either of said devices, nor any part of the same, irrespective of my construction thereof.

Having thus described my invention, what I claim as new is—

In a revolving fire-arm, the combination of a cylinder, provided with two series of stop recesses or indents, and a double stop pivoted in the trigger and having a movement independent thereof, and having the end each side of its pivot adapted to engage in said recesses or indents, substantially as set forth.

DANIEL B. WESSON.

Witnesses:
T. A. CURTIS,
V. N. TAYLOR.